(12) United States Patent
Tender

(10) Patent No.: US 8,012,616 B2
(45) Date of Patent: Sep. 6, 2011

(54) ADVANCED APPARATUS FOR GENERATING ELECTRICAL POWER FROM AQUATIC SEDIMENT/WATER INTERFACES

(75) Inventor: Leonard M. Tender, Bethesda, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 12/968,547

(22) Filed: Dec. 15, 2010

(65) Prior Publication Data

US 2011/0104518 A1    May 5, 2011

(51) Int. Cl.
H01M 6/34 (2006.01)
(52) U.S. Cl. ............ 429/47; 429/50; 429/105; 429/119
(58) Field of Classification Search ............... 429/2, 47, 429/50, 105, 118, 401, 119
See application file for complete search history.

(56) References Cited

U.S. PATENT DOCUMENTS

| | | | |
|---|---|---|---|
| 4,085,254 A | | 4/1978 | Atkins |
| 4,278,743 A | | 7/1981 | Thompson |
| 5,158,838 A | | 10/1992 | Bjordal et al. |
| 5,242,768 A | | 9/1993 | Nagatsuka et al. |
| 5,288,564 A | | 2/1994 | Klein et al. |
| 5,427,871 A | | 6/1995 | Garshol et al. |
| 5,770,945 A | | 6/1998 | Constable |
| 5,922,903 A | | 7/1999 | Pujado |
| 6,168,882 B1 * | 1/2001 | Inoue et al. ................. 429/119 |
| 6,575,248 B2 | | 6/2003 | Zhang et al. |
| 6,913,854 B1 | | 7/2005 | Alberte et al. |
| 7,550,224 B1 * | 6/2009 | Tender et al. ................. 429/50 |
| 2006/0172186 A1 | | 8/2006 | Tender |

FOREIGN PATENT DOCUMENTS

WO     01/39306 A1    5/2001

OTHER PUBLICATIONS

Bilal, "Thermo-Electrochemical Reduction of Sulfate to Sulfide Using a Graphite Cathode," J. Appl. Electrochem., 28, 1073, (1998).
Bond D.R. et al. "Electrode Reducing Microorgaisms that Harvest Energy from Marine Sediments" Science, vol. 295, 483-485 Jan. 18, 2002.
DeLong, E.F. et al. "Power From the Deep" Nature Biotechnology, vol. 20, pp. 788-789, Aug. 2002.
Habermann, et al., "Biological Fuel Cells With Sulphide Storage Capacity," Applied Microbiology Biotechnology, 35, 128, (1991).

(Continued)

*Primary Examiner* — Stephen J. Kalafut
(74) *Attorney, Agent, or Firm* — Amy Ressing; Roy Roberts

(57) ABSTRACT

An improved benthic microbial fuel cell for generating energy at the interface of aquatic sediment and seawater includes an anode electrode embedded within the aquatic sediment, a cathode electrode positioned within the seawater and above the aquatic sediment, a rig for maintaining the relative positions of the anode and cathode electrodes, electrical leads extending from the anode and cathode electrodes to a load, wherein the anode electrode comprises a bottle-brush electrode residing within a permeable tube. The apparatus is easier to deploy than previously-described fuel cells, while being lighter, more durable, and generating greater power density. Also disclosed are methods of generating power from such an apparatus.

9 Claims, 3 Drawing Sheets

OTHER PUBLICATIONS

Reimers, C.E. et al. "Harvesting Energy from Marine Sediment-Water Interface" Environ. Sci. Technol. 2001, 35,192-195, Nov. 16, 2000.

Tender, L.M. et al. "Harnessing Microbially Generated Power on the Seafloor" Nature Biotechnology, vol. 20, pp. 821-825, Aug. 2002.

Tender, et al., "The first demonstration of a microbial fuel cell 53 as a viable power supply: Powering a meteorological buoy," J. Power Sources, vol. 179, Issue 2, pp. 571-575 (2008).

Zhang, et al., "Modelling of a Microbial Fuel Cell Process," Biotechnology Letters, vol. 17 No. 8, pp. 809-814 (Aug. 1995).

* cited by examiner

ADVANCED APPARATUS FOR GENERATING ELECTRICAL POWER FROM AQUATIC SEDIMENT/WATER INTERFACES

BACKGROUND

Marine-deployed electronic devices such as sensors are typically powered by batteries. However, batteries eventually deplete and require replacement. Thus, long-term continuous function of deployed devices would involve periodic retrieval and replacement of their battery packs, which can be expensive, time-consuming, and dangerous.

One attempt at a solution to this problem is described in U.S. Pat. No. 6,913,854 which describes an apparatus referred to as a benthic microbial fuel cell (BMFC), which is a microbial fuel cell that persistently generates electrical power from the marine sediment/water interface to operate marine deployed electronic devices.

A benthic fuel cell generates electrical power by oxidizing organic matter (fuel) residing in sediment pore water with oxygen (oxidant) in overlying water. It includes of a non-corrosive anode (typically consisting of but not limited to graphite) embedded in marine sediment and connected by an external electrical circuit to a non corrosive cathode (also typically consisting of but not limited to graphite) positioned in overlying water.

The BMFC uses biofilms that spontaneously form on the electrode surfaces to catalyze the reactions. Because mass transport of the reactants and products is provided by natural environmental processes and because the biofilm catalysts continuously regenerate themselves, BMFCs are capable of persistent power generation. Thus, the BMFC is of interest for continuously recharging batteries for long-term operation of marine-deployed electronic devices. Such a hybrid approach is expected to allow persistent operation provided by the BMFC with ability to utilize short bursts of peak power provided by batteries as required, for example, by radio transmission of data.

However, prior BMFCs have various undesirable properties impeding their utilization, in that they are fragile, large, and difficult to properly arrange at the sediment/water interface. These problems have prevented BMFCs from replacing batteries in actual use in marine-deployed electronic devices. A need exists for an improved source of electrical power for such devices.

BRIEF SUMMARY

In a first embodiment, an apparatus for generating energy at the interface of aquatic sediment and seawater includes an anode electrode embedded within the aquatic sediment, a cathode electrode positioned within the seawater and above the aquatic sediment, a rig for maintaining the relative positions of the anode and cathode electrodes, electrical leads extending from the anode and cathode electrodes to a load, wherein the anode electrode comprises a bottlebrush electrode residing within a permeable tube.

In another embodiment, a method of generating power from voltage gradients at interfaces between water and aquatic sediment includes positioning a first electrode in sediment below the interface; positioning a second electrode in the water over the first electrode; and connecting electrical leads between the electrodes and a load to create a current between the electrodes, wherein the first electrode comprises a bottlebrush electrode residing within a permeable tube.

DETAILED DESCRIPTION

Described herein is an advanced benthic microbial fuel cell (ABMFC) that operates by electrochemically converting organic matter residing in marine sediment with oxygen in overlying water to generate electrical power, and uses biofilms that spontaneously form on the electrode surfaces to catalyze the electrode reactions. Unlike prior benthic microbial fuel cells (BMFCs), the ABMFC is durable, easy to properly orientate on the sediment surface, and more than 20-fold smaller than state-of-art BMFCs based on power output per unit volume. As a result, the ABMFC is competitive with respect to cost and volume of state of art battery packs for long term power.

DEFINITIONS

Before describing the present invention in detail, it is to be understood that the terminology used in the specification is for the purpose of describing particular embodiments, and is not necessarily intended to be limiting. Although many methods, structures and materials similar, modified, or equivalent to those described herein can be used in the practice of the present invention without undue experimentation, the preferred methods, structures and materials are described herein. In describing and claiming the present invention, the following terminology will be used in accordance with the definitions set out below.

A bottle brush electrode refers to an electrode having a plurality of electrochemically active conductive fibers uniformly distributed and extending outward from the main axis of a current collecting conductive body. Examples of such electrodes are described in U.S. Patent Application Publication No. 2006/0172186 and U.S. Pat. No. 5,427,871.

As used in this specification and the appended claims, the singular forms "a", "an," and "the" do not preclude plural referents, unless the content clearly dictates otherwise.

As used herein, the term "and/or" includes any and all combinations of one or more of the associated listed items.

DESCRIPTION

Figure 1:
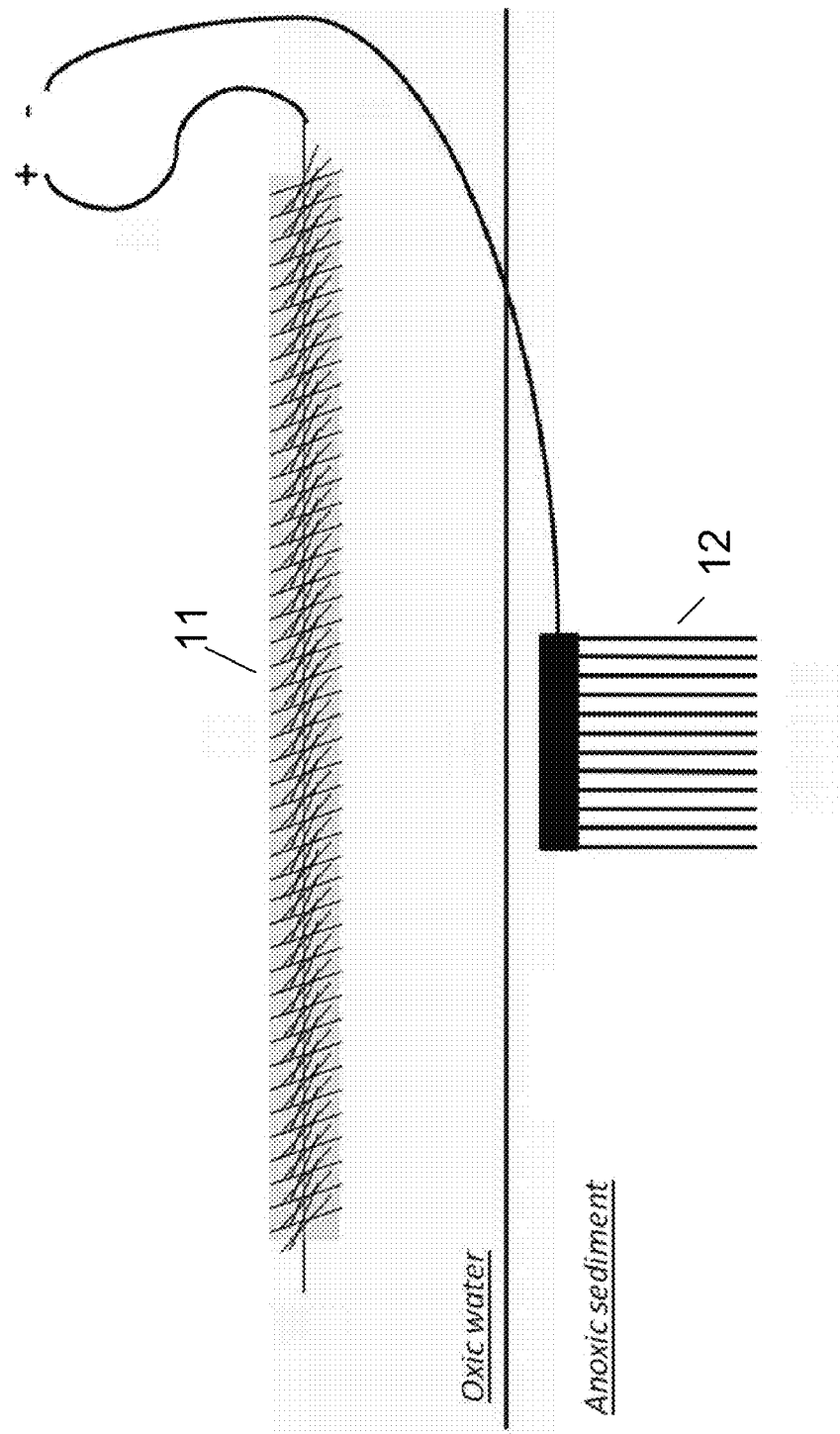
FIG. 1 is a schematic of a prior art benthic fuel cell.

FIG. 1 illustrates a schematic of a prior art benthic microbial fuel cell (BMFC). Such a fuel cell is described in Tender et al., *J. Power Sources* 179 (2008) 571-575. The cathode 11 includes a bottle brush electrode in the oxic water. The anode 12 is embedded in the anoxic sediment and comprises an electrode having a series of parallel graphite plates. The fuel cell is normally connected to an external circuit (not shown), such as a sensor (for example, an acoustic sensor) and/or a transmitter.

Previously described BMFCs having anodes fabricated from graphite plates, which provide desirable chemical and microbial properties along with rigidity required in order to embed the electrode into sediment. The generation of an amount of power sufficient to operate typical marine-deployed electronic devices (on the order 0.5 Watt) requires large scale anodes comprising of many plates that must be embedded into sediment. The most practical configuration for such anodes with respect to minimizing volume for transport are arrays of parallel graphite plates inserted vertically into sediment (see for example Tender et al., *J. Power Sources* 179 (2008) 571-575). Typically, the plates about 12"-tall×12"-wide×¼"-thick (30.48 cm×30.48 cm×0.635 cm) and therefore must be embedded at least 12" (30.48 cm) beneath the sediment surface.

Key limitations of previously-described BMFCs are: (1) fragility of their graphite plate-based anodes which leads to a low successful rate of utilization owing to breakage during transport and deployment; (2) their large bulk and weight due to use of graphite plate-based anodes which greatly complicates their transport and deployment, and results in a low power density with respect to volume; (3) difficult embedment of the graphite plate-based anodes which is typically performed by manually sliding or burying the anodes into sediment and has thus far limited BMFC deployment to diver accessible depths and locations; (4) shielding of some plates in the anode array by other plates in the anode array to the natural flux of organic matter in sediment pore water due to motion of sediment pore water driven by motion of overlying water (as provided by currents, tides, and the like); and (5) high internal resistance due to the high resistance to flux of protons through the sediment due to the embedment depth and shielding.

Figure 2:
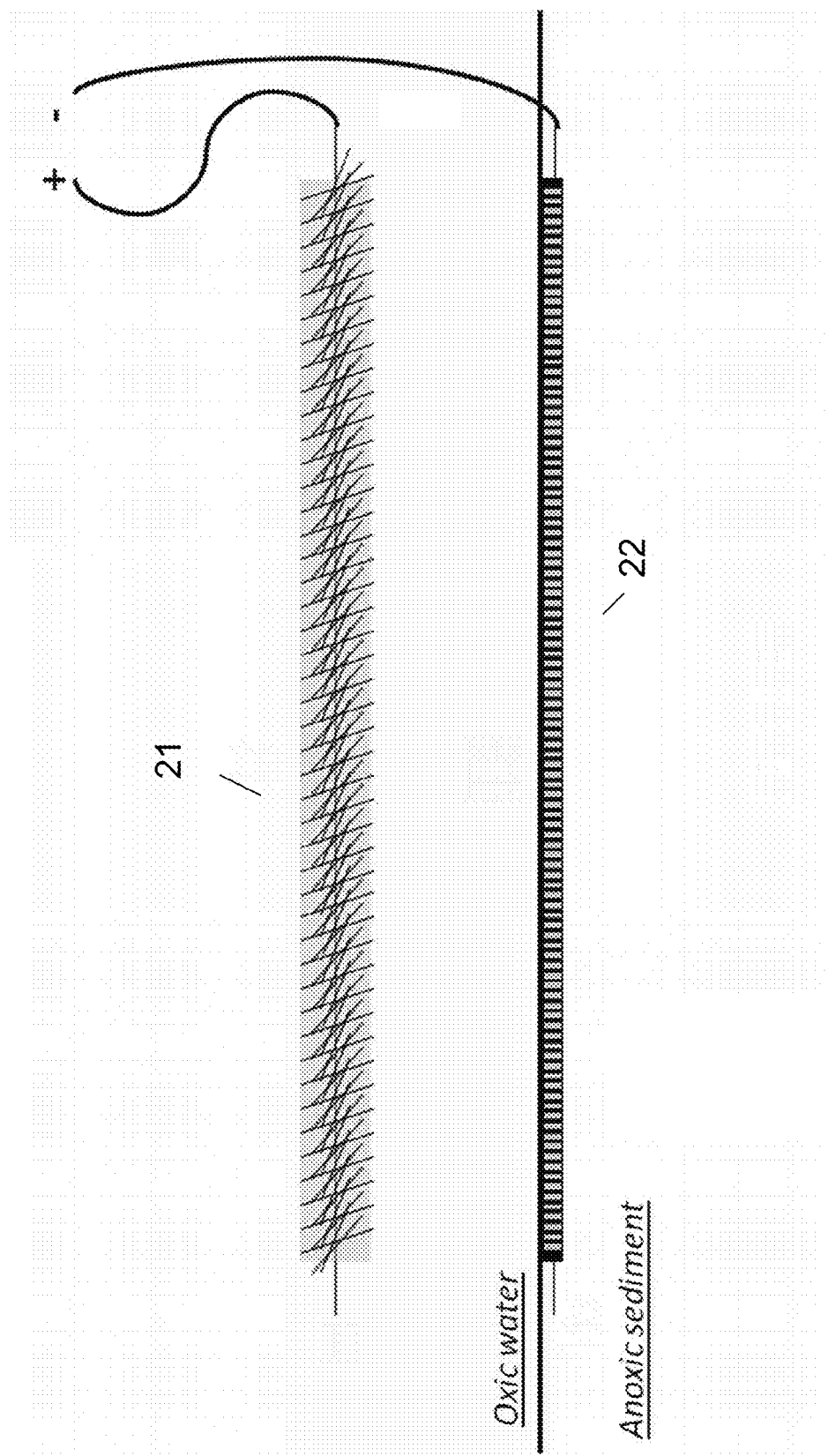
FIG. 2 is a schematic an exemplary embodiment of the described advanced benthic microbial fuel cell.

The advanced benthic microbial fuel cell ("ABMFC"), an example of which is seen schematically in FIG. 2, overcomes these limitations. The exemplary electrode of FIG. 2 has a bottlebrush electrode for the anode 22 as well as the cathode 21. The carbon fiber strands of the bottlebrush electrode are fluffy and easily compress in order to fit into a protective permeable tube, while avoiding compaction to the point of substantially inhibiting mass transport of anode reactants and products through the anode. For example, the anode, which typically has an uncompressed diameter of about 4" (10.16 cm), can easily be compressed into a 1" (2.54 cm) diameter tube which is much easier to embed in the sediment surface as compared to a conventional anode comprising parallel graphite plates, because it can be embedded horizontally into sediment, parallel to the sediment surface, to a much shallower depth, and with a much smaller foot print area, than the prior state of art, all of which greatly simplifies deployment. The protective permeable tube ensures that carbon fiber strands of the bottlebrush electrode do not fully compact to the point of inhibiting mass transport of anode reactants and products through the anode, which tends to occur if the anode is directly embedded into the sediment. The protective tube is preferably slotted or perforated, or otherwise permeable to enable mass transport of anode reactants and products between the anode inside the tube and marine sediment outside of the tube.

Graphite bottlebrush electrodes are described in U.S. Patent Application Publication No. 2006/0172186 and U.S. Pat. No. 5,427,871. When used as cathodes, these electrodes have favorable chemical and microbial properties, are lightweight, easy to suspend in water, and are very effective at utilizing oxygen in moving seawater owing to their very high surface area and permeable nature by which individual carbon fiber strands access water and sway in water so as not to block access by other strands.

U.S. Patent Application Publication No. 2006/0172186 describes a BMFC with a bottlebrush anode inside a tube/chamber, however the tube/chamber is inserted vertically in sediment and only the bottom is open, with the main body of the tube remaining impermeable. A pump is used to draw sediment pore water (where fuel resides) through the bottom (like a drinking straw) to the anode and out through an outlet in order to increase mass transport of fuel to the anode and products away. This arrangement permits the generation of high power densities, but only without taking into account the power required for pumping. To date, the technology described in U.S. Patent Application Publication No. 2006/0172186 has not been demonstrated to operate to generate more power than it consumes. Moreover, the pump represents a liability with respect to limiting unattended lifespan of the apparatus due to clogging, or otherwise failing. Accordingly, the ABMFC described herein, which does not require a pump, represents a significant advancement over the prior-described technology. By using a tube that is permeable throughout, the anode benefits from natural mass transport of sediment pore water that occurs just beneath the sediment/water interface without external pumping, and moreover can be effectively and easily deployed essentially parallel to the surface of the aquatic sediment.

In one exemplary embodiment, the bottlebrush electrode comprises electrochemically active conductive fibers in the form of lengths of graphite yarn (for example, about 4 inches long) pinched between a current collecting conductive body comprising a number of twisted stainless steel wires (for example, two such wires). In a further aspect, each length of yarn comprises approximately 3000 individual 7-mm diameter graphite fibers. Preferably, the graphite fiber has been subject to heat treatment thereby causing separation of the fibers, which increases catalytic activity. In a further embodiment, a bottlebrush electrode comprises 4"-diameter×60"-long graphite bottlebrush anode which can be inserted into a 1"-diameter×60"-long slotted PVC tube.

The described ABMFC has been evaluated in the field and found to remediate aspects of the previously-described BMFC that limit power while desirably reducing volume and increasing durability.

Figure 3:
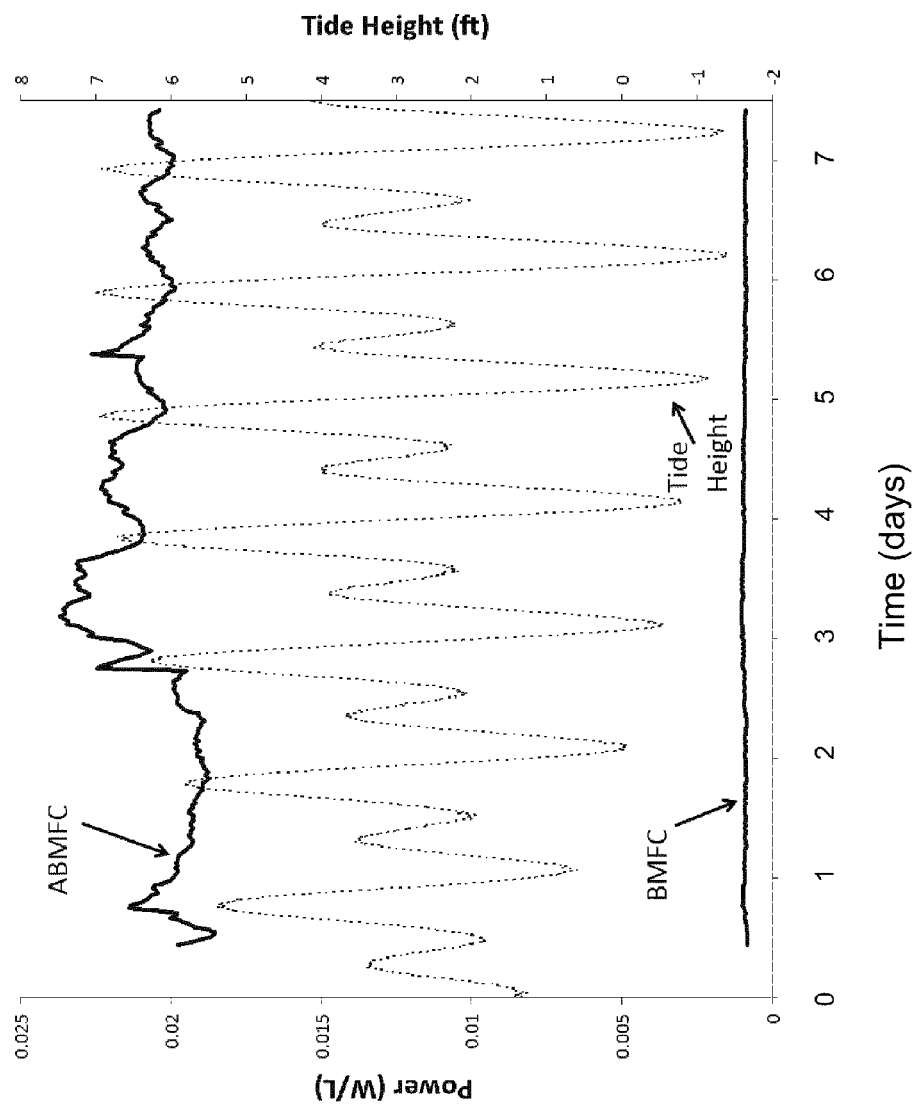
FIG. 3 shows a comparison between the described fuel cell and a prior art fuel cell lacking the described bottle-brush anode electrode.

As seen in FIG. 3, the described ABMFC was compared to a previously-described BMFC with regard to power generation per electrode volume (Watts per liter). The BMFC anode has an array of twelve graphite plates, each 12"-tall×12"-wide×¼"-thick. The 12"-tall BMFC anode was embedded vertically (plates pointing downward) into sediment with extensive manipulation by divers. The anode forcedly was inserted into the sediment which was partially liquefied by water jetting such that the top of the anode was approximately 1" beneath the sediment surface. The ABMFC had a bottlebrush anode electrode comprising 4"-diameter×60"-long graphite bottlebrush anode inserted into a 1"-diameter×60"-long slotted PVC tube. The 1"-diameter ABMFC anode was embedded horizontally (bottle brush electrode parallel to the sediment surface) with minimum manipulation by divers. The anode was pressed into undisturbed sediment such that the top anode was approximately 1"-beneath the sediment surface. In each, the cathode was a 60-inch long carbon fiber bottle brush electrode suspended in water about 1-ft above the sediment surface. Over a period of several days, it can be seen that the ABFMC consistently provided a much higher power density.

The results suggest that (1) the ABMFC tube-enclosed anode is significantly easier to embed than the state-of-art BMFC anode and (2) the ABMFC tube-enclosed anode benefits from enhanced and unrestricted mass transport though the anode of pore water containing organic matter and anode generated protons.

The described advanced benthic microbial fuel cell enjoys numerous advantages over previously-described devices that employ anodes fabricated from graphite plates. It is significantly more durable, for example it can survive being dropped by fork truck operator. It is lighter in weight by a factor of about 10. It is significantly easier to deploy in that it involves pressing a 1"-diameter tube into sediment instead of burying a 12"-tall cube into sediment. It provides a higher power density based on volume, by factor of 20.

All publications mentioned herein are hereby incorporated by reference for the purpose of disclosing and describing the particular materials and methodologies for which the reference was cited.

Although the present invention has been described in connection with preferred embodiments thereof, it will be appreciated by those skilled in the art that additions, deletions, modifications, and substitutions not specifically described may be made without departing from the spirit and scope of the invention. Terminology used herein should not be construed as being "means-plus-function" language unless the term "means" is expressly used in association therewith.

What is claimed is:

1. An apparatus for generating energy at the interface of aquatic sediment and seawater, the apparatus comprising:
    an anode electrode embedded within the aquatic sediment;
    a cathode electrode positioned within the seawater and above the aquatic sediment;
    a rig for maintaining the relative positions of the anode and cathode electrodes; and
    electrical leads extending from the anode and cathode electrodes to a load,
    wherein the anode electrode comprises a bottlebrush electrode residing within a permeable tube.

2. The apparatus of claim 1, wherein the cathode electrode comprises a graphite-fiber bottlebrush electrode.

3. The apparatus of claim 2, wherein said permeable tube is slotted or perforated.

4. The device of claim 3, wherein said load comprises a battery and optionally a charging circuit.

5. The device of claim 3, wherein said load comprises a sensor and/or a transmitter.

6. The device of claim 3, wherein said load an acoustic sensor.

7. A method of generating power from a voltage gradients at an interface between water and aquatic sediment, the method comprising:
    positioning a first electrode in sediment below the interface;
    positioning a second electrode in the water over the first electrode; and
    connecting electrical leads between the electrodes and a load to create a current between the electrodes,
    wherein the first electrode comprises a bottlebrush electrode residing within a permeable tube.

8. The method of claim 7, wherein said first electrode comprises a graphite-fiber bottlebrush electrode.

9. The method of claim 8, wherein said graphite-fiber bottlebrush electrode is in a compressed state within said permeable tube.

* * * * *